United States Patent [19]

Jang et al.

[11] Patent Number: 5,667,453

[45] Date of Patent: Sep. 16, 1997

[54] HYDRAULIC CONTROL SYSTEM OF AN AUTOMATIC TRANSMISSION USED IN A VEHICLE

[75] Inventors: Jaeduk Jang; Kibeen Lim, both of Yongin-kun, Rep. of Korea

[73] Assignee: Hyundai Motor Company, Rep. of Korea

[21] Appl. No.: 579,346

[22] Filed: Dec. 27, 1995

[30] Foreign Application Priority Data

Dec. 28, 1994 [KR] Rep. of Korea ............... 94-37992

[51] Int. Cl.$^6$ .................. F16H 61/06; F16H 61/08
[52] U.S. Cl. ............................ 475/129; 477/131
[58] Field of Search ................ 475/129; 477/131, 477/152

[56] References Cited

U.S. PATENT DOCUMENTS 4,870,877 10/1989 Hasegawa et al. .
5,003,842 4/1991 Hatta et al. .
5,337,625 8/1994 Jang ........................... 74/335
5,367,922 11/1994 Jan ............................ 74/732.1
5,375,483 12/1994 Kim et al. .................. 74/730.1
5,507,706 4/1996 Jang et al. ................. 477/131
5,537,887 7/1996 Jang et al. ................. 477/131
5,540,634 7/1996 Jang et al. ................. 477/131

*Primary Examiner*—Dirk Wright
*Attorney, Agent, or Firm*—Finnegan, Henderson, Farabow, Garrett & Dunner, L.L.P.

[57] ABSTRACT

A hydraulic control system of a vehicle automatic transmission includes a torque converter, an oil pump, a pressure regulator, a damper clutch working control means, a manual valve, an N-D control valve, a torque control regulator valve, a control switch valve, a first to second, second to third, third to fourth, and third to second shift valves, a low/reverse clutch valve, a third clutch valve, and a second to fourth brake valve.

9 Claims, 11 Drawing Sheets

HYDRAULIC CONTROL SYSTEM OF AN AUTOMATIC TRANSMISSION USED IN A VEHICLE

BACKGROUND OF THE INVENTION (1) Field of the Invention

The present invention concerns a system for controlling hydraulic pressure in an automatic four-speed transmission.

(2) Description of the Prior Art

The automatic transmission comprises a torque converter, multi-stage gear shift mechanism connected with the torque converter, and a plurality of friction elements for selecting one of the gear shift stages. The friction elements are worked through a plurality of control valves for controlling the hydraulic pressure applied by the hydraulic control system.

Such a hydraulic control system comprises a pressure regulating means for regulating the hydraulic pressure produced by an oil pump, manual and automatic transmission control means for selecting one of the shift modes, pressure control means for controlling the shifting sense and responsiveness to make a gear shift smooth, damper clutch control means for working the damper clutch of the torque converter, and pressure distribution means for distributing properly the hydraulic pressure among the friction elements. The pressure control means controls the pressures applied to the friction elements, torque converter, solenoid valves, etc., which substantially affect the shifting sense.

When performing the shift operation, it is preferable to supply controlled hydraulic pressures to the friction elements while completing the shift operation with the drive pressure. Such transmission control means are disclosed in U.S. patent application Ser. No. 08/347,312, now U.S. Pat. No. 5,507,706, filed by the present applicant, which suffers the shift shock caused by the drive pressure or the backward pressure applied to the friction elements in the manual shifting when making the forward or the backward movement. When this means is applied to an automatic transmission of a vehicle providing four gearshift stages, the engine brake is not worked in the "D" range third speed, so that, if the engine brake is not worked in the emergency mode of the third speed, a dangerous situation is encountered due to the vehicle's running inertia. Moreover, if the second to third one-way clutch is omitted, the skip shift control from the fourth speed to the second speed can not be performed smoothly, thus resulting in the occurrence of a shift shock.

SUMMARY OF THE INVENTION

It is an object of the present invention to provide a means for omitting a one-way clutch to simplify the power train of an automatic transmission with improving the running stability.

According to the present invention, a hydraulic control system of an automatic transmission used in a vehicle, comprises:

a torque converter for transferring the engine power to the input shaft of the transmission;

an oil pump for pumping an oil by means of the engine power;

a pressure regulation means for regulating the line pressure produced by the oil pump according to the vehicle's running condition;

a damper clutch working control means for changing the direction of the pressure delivered to the torque converter in order to increase the power transfer rate of the torque converter;

a manual valve operatively linked with a shift lever for performing the port change to supply the transmission with a hydraulic pressure suitable to each shifting mode;

N-D control valve for supplying the torque pressure and the drive pressure to the first friction element to reduce the shifting shocks during the range changing from the neutral mode to the running mode;

a torque control regulator valve for converting the drive pressure to the torque control valve according to the duty control;

a control switch valve for alternately supplying the torque pressure of the torque control regulator valve to a first and a second torque pressure line according to on/off operation of another solenoid valve;

a first to second, a second to third, a third to fourth and a third to second shift valve for making a port change with the control port receiving/discharging a hydraulic pressure according to the on/off operation of the solenoid valves so as to selectively supply the torque pressure of the first and the second torque pressure line and the drive pressure of the manual valve to each friction element; and a low/reverse clutch valve, a third clutch valve, and a second to fourth brake valve for receiving or supplying the torque pressure or drive pressure from or to the shift valves.

The present invention will now be described more specifically with reference to the drawings attached only by way of example.

DETAILED DESCRIPTION OF PREFERRED EMBODIMENTS

Figure 1:
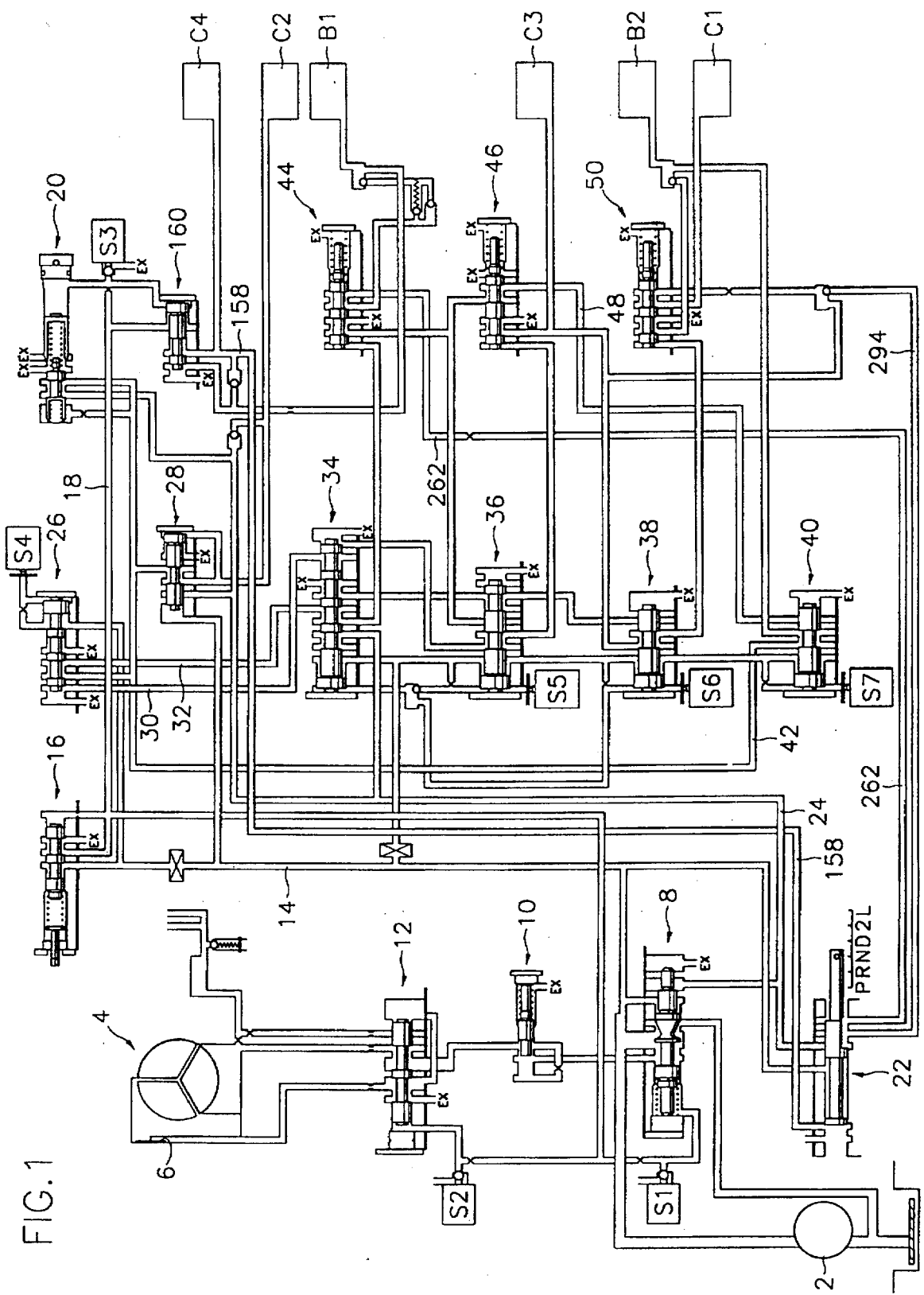
FIG. 1 is a schematic diagram illustrating the circuit of a hydraulic control system according to an embodiment of the present invention.

Referring to FIGS. 1, there are shown an oil pump 2 for pumping an oil by means of the power of an engine, a torque converter 4 for delivering the power of the engine to the input shaft of an automatic transmission, a damper clutch 6 provided in the torque converter for increasing power transfer ratio, and a pressure regulation valve 8 for modifying the hydraulic pressure generated by the oil pump according to the drive condition of a vehicle. The pressure of the pressure regulation valve 8 is supplied to the torque converter and the lubrication elements by means of a converter feed valve 10. The damper clutch is controlled by a converter clutch control valve 12.

The pressure regulation valve 8 is designed to make a port change by means of a first solenoid valve S1 subjected to the duty control of a transmission control unit (TCU), and the converter clutch control valve 12 by means of a second solenoid valve S2. The pressure regulation valve 8 is connected to the solenoid supply valve 16 through the pressure line 14. The pressure of the solenoid supply valve is supplied to the first and the second solenoid valve S1 and S2, and to the third solenoid valve S3 via the pressure line 18.

The third solenoid valve S3 is related to the port change of the torque control valve 20, which receives the pressure of the pressure line 14, connected to the manual valve 22 and the drive pressure line 24 making a port change according to the position of the shift lever (not shown). The torque control valve 20 supplies the torque pressure controlled by the third solenoid valve S3 to the control switch valve 26, and is connected to the N-D control valve 28 reducing the shifting shocks transferring the torque pressure.

After supplying the torque pressure to the first friction element C2 at the start of the shifting, the N-D control valve 28 performs the port change to convert the working pressure of the first friction element to the drive pressure reducing the shifting shock. The fourth solenoid valve S4 is controlled on/off by the TCU so as to selectively supply the torque pressure of the control switch valve 26 to the first or the second torque pressure line 30 or 32, which are connected to the first to second shift valve 34 for supplying a hydraulic pressure to the second friction element B2 when shifting from the first speed to the second speed. The first to second shift valve supplies the pressure of the torque pressure line to the second friction element at the beginning, but makes a port change to convert to the drive pressure at the completion of the synchronization.

The second to third shift valve 36, which receives the torque pressure of the first to second shift valve 34 in the second speed shift stage to supply it to the third friction element C3 when shifting to the third speed, makes a port change by means of the fifth solenoid valve S5 controlled on/off by the TCU to supply the working pressure to the fourth friction element C1 and the torque pressure to the third to fourth shift valve 38. The third to fourth shift valve 38 makes a port change by means of the sixth solenoid valve S6 controlled on/off by the TCU to supply a pressure to the second friction element B2 accomplishing the shift control of the fourth speed.

The third to second shift valve 40, which receives the pressure of the third to fourth shift valve 38 to make a port change by the on/off operation of the seventh solenoid valve S7, receives the torque pressure directly from the torque control valve 20 through the pressure line in the shifting from the third speed to the second speed, thus working the second friction element B2. The low/reverse clutch valve 44, which receives the pressure from the first to second shift valve 34 in the second speed of "D" range, supplies the pressure to the second to third shift valve 36 and the third clutch valve 46, whose pressure is supplied through the pressure line 48 to the third to second shift valve 40. The second speed control is accomplished by the second friction element B2 receiving the pressure of the third to second shift valve 40.

Figure 2:
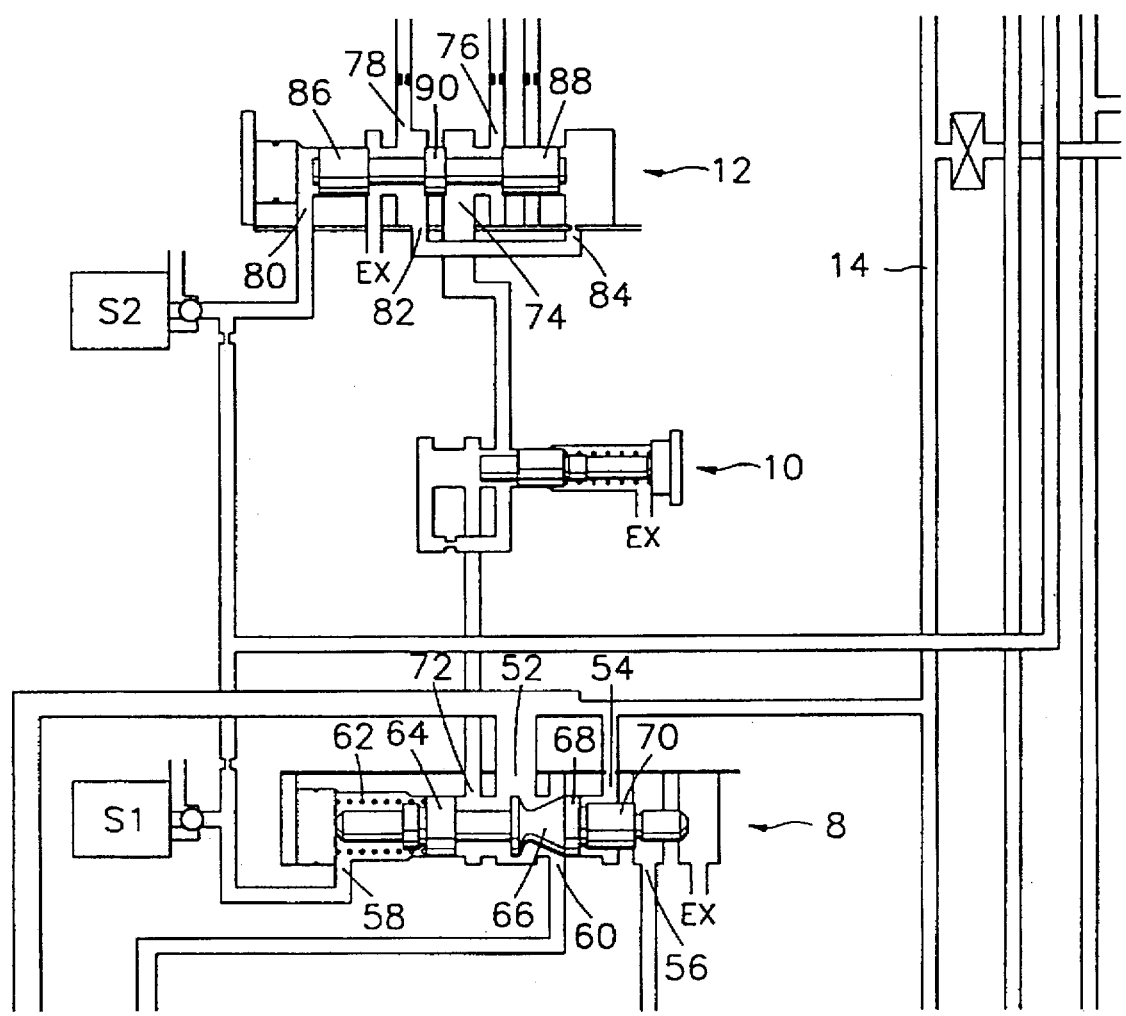
FIG. 2 is an enlarged circuit diagram showing the pressure regulation means of FIG. 1.

The third clutch valve 46 receives the pressure of the second to third shift valve 36 to work the third friction element C3, and supplies the pressure to the third to fourth shift valve 38 to the fourth brake valve 50 working the fourth friction element C1. As shown in FIG. 2, the pressure regulation valve 8 includes a first and a second port 52 and 54 for receiving the pressure of the oil pump 2 and connected to the pressure line 14, a third port 56 for receiving the pressure of the drive pressure line 24, a fourth port 58 for receiving the pressure controlled by the first solenoid valve S1, and a fifth port 60 for discharging the remaining pressure. The valve spool resiliently supported by a spring 62 has a first land 64 for receiving the pressure of the fourth port 58, a second land 66 for adjusting the amount of the opening of the fifth port 60 to discharge the oil, a third land 68 for receiving the pressure of the second port 54, and a fourth land 70 for receiving the pressure of the third port 56.

The pressure regulation valve 8 has a sixth port 72 for supplying the pressure to the converter feed valve 10, which is to supply the pressure to the converter clutch control valve 12 for working or releasing the damper clutch 6 of the torque converter 4. In addition, the converter clutch control valve 12 supplies oil to each of the lubricating elements. Such operation is accomplished by the second solenoid valve S2 variably controlled by the TCU.

The converter clutch control valve 12 has a first port 74 for receiving a hydraulic pressure, a second port 76 for supplying a hydraulic pressure for working the damper clutch, a third port 78 for supplying a hydraulic pressure for releasing the damper clutch, a fourth port 80 for forming or releasing a hydraulic pressure by the second solenoid valve S2, and a fifth and a sixth port 82 and 84 for supplying a hydraulic pressure against the hydraulic pressure supplied to the fourth port. The valve spool of the converter clutch control valve 12 has a first land 86 for receiving the hydraulic pressure of the fourth port 80, a second land 88 for closing the second port 76, and a third land 90 for closing the third port 78.

Figure 3:
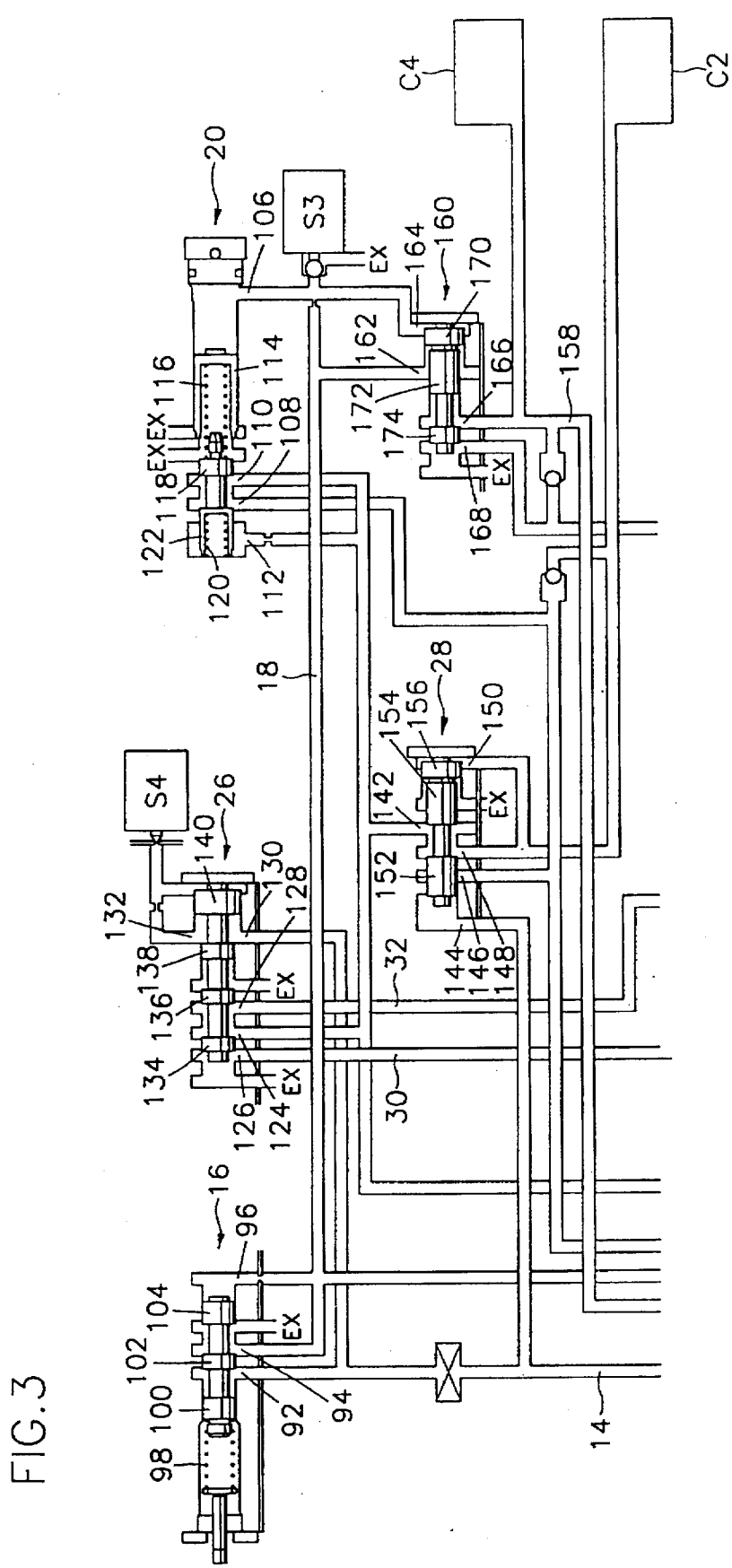
FIG. 3 is an enlarged circuit diagram showing the torque pressure converting and supplying means of FIG. 1.

The solenoid supply valve 16, which supplies the line pressure provided from the manual valve 22 through the pressure line 14 to the first, second and third solenoid valves, has a first port 92 for communicating with the pressure line 14, a second port 94 for supplying the pressure of the first port to the pressure line 18, and a third port 96 for receiving the pressure of the second port, as shown in FIG. 3. The valve spool of the solenoid supply valve 16 has a first land 100 resiliently supported by a spring 98, a second land 102 for determining the opening amount of a second port 94, and a third land 104 for receiving the pressure of the third port 96.

The torque control valve 20 for making a port change by the on/off of the third solenoid valve S3 has a first port 106 for receiving the control pressure, a second port 108 for receiving the hydraulic pressure from the manual valve through the drive pressure line 24, and a third and a fourth port 110 and 112 for selectively receiving the pressure of the second port according to the port change. This valve includes a first plug 114 moved by the pressure of the first port 106, a spring 116 for resiliently supporting the first plug, a land 118 resiliently supported by the opposite end of the spring, and a second plug 122 resiliently supported by another spring 120.

The control switch valve 26 for selectively receiving the hydraulic pressure from the second and third ports 110 and 112 has a first port 124 connected with the second and third ports 110 and 112, a second and a third port 126 and 128 for selectively discharging the hydraulic pressure of the first port, a fourth port 130 for directly receiving the pressure of the pressure line 14, and a fifth port 132 for supplying a hydraulic pressure opposite to the pressure of the fourth port to the valve spool in order to make a proper port change. The valve spool of the control switch valve 26 has a first land 134 for closing the first and the second port 124 and 126, a second land 136 for closing the first and the third port 124 and 128, a third land 138 for receiving the pressure of the fourth port 130, and a fourth land 140 for receiving the pressure of the fifth port 132.

The N-D control valve 28 for receiving the torque pressure from the torque control valve 20 in order to reduce the shifting shock when shifting from the neutral mode to the driving mode has a first port 142 for receiving the torque pressure, a second port 144 for receiving the line pressure, a third port 146 for receiving the drive pressure, a fourth port 148 for supplying the pressure of the third port to the first friction element C2, and a fifth port 150 for performing a port change by receiving the pressure of the fourth port 148. The valve spool of the N-D control valve includes a first land 152 for receiving the pressure of the second port 144, a second land 154 for blocking the pressure supplied to the first port 142, and a third land 156 for receiving the pressure of the fifth port 150.

The reverse clutch control valve 160 for supplying a hydraulic pressure to the first friction element C4 in the reverse mode has a first port 162 for receiving the pressure of the solenoid supply valve 16, a second port 164 for receiving the control pressure of the third solenoid valve S3, a third port 166 for receiving the pressure from the manual valve 22 through the rear pressure line 158, and a fourth port 168 for supplying the reverse drive pressure of the third port to the second friction element B1. The valve spool has a first land 170 for receiving the pressures of the first and second ports 162 and 164 from opposite directions, a second land 172 for receiving the pressure of the third port 166, and a third land 174 for closing the third and fourth ports 166 and 168.

Figure 4:
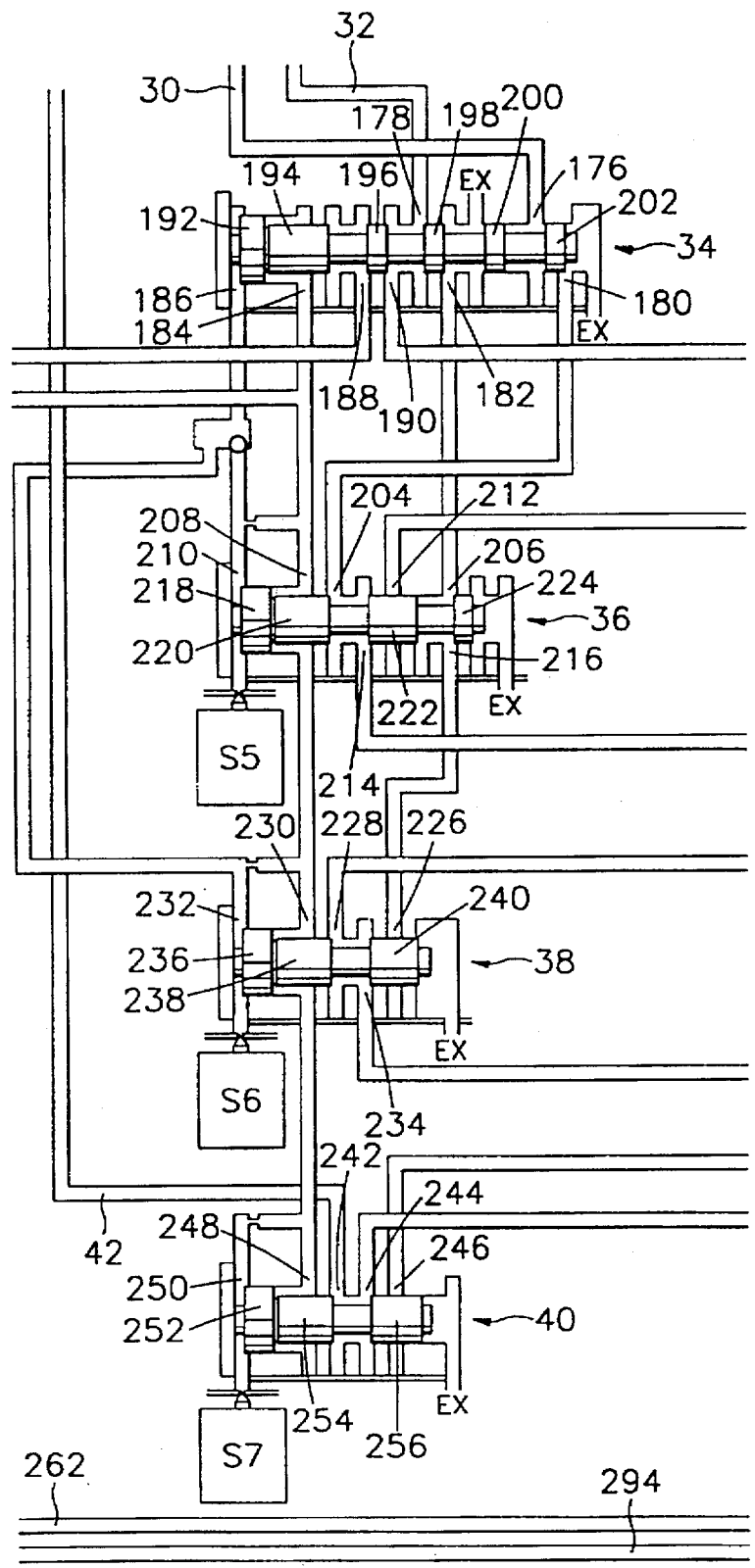
FIG. 4 is an enlarged circuit diagram showing the shift valves of FIG. 1.

Referring to FIG. 4, the first to second shift valve 34 for supplying the hydraulic pressure to the second friction element B2 when shifting from the first speed of "D" range to the second speed has a first and a second port 176 and 178 for receiving the torque pressure respectively from the first and the second torque pressure line 30 and 32. In addition, the first to second shift valve 34 has a third port 180 for supplying the pressure of the first port 176 to one port of the second to third shift valve 36, and a fourth port 182 for supplying the pressure of the second port 178 to another port of the second to third shift valve 36. Besides, there are provided a fifth and a sixth port 184 and 186 for receiving the pressure of the pressure line 14, a seventh port 188 for receiving the pressure of the drive pressure line 24, and an eighth port 190 for selectively discharging the pressure of the seventh port or the second port 178.

The valve spool of the first to second shift valve 34 includes a first land 192 for receiving the pressures of the fifth and sixth ports 184 and 186 from opposite directions, a second land 194 for receiving the pressure of the seventh port 188, a third land 196 for connecting or disconnecting the eighth port 190 with the seventh port 188, a fourth land 198 for connecting or disconnecting the second port 178 with fourth port 182, a fifth land 200 for receiving a part of the pressure of the first port 176, and a sixth land 202 for receiving the pressure of the third port 180.

The second to third shift valve 36 for supplying the pressure to the third friction element C3 when shifting from the second speed to the third speed has a first port 204 connected with the third port 180 of the first to second shift valve 34, a second port 206 connected to the fourth port 182 of the first to second shift valve 34, a third port 208 for receiving the pressure of the pressure line 14, and a fourth port 210 for receiving the pressure of the pressure line 14 controlled by the on/off operation of the fifth solenoid valve S5. In addition, there are provided a fifth port 212 for receiving the pressure from the low/reverse valve 44, a sixth port 214 for selectively supplying the pressure of the first or fifth port 204 or 212 to the third clutch valve 46, and a seventh port 216 for supplying the pressure of the second port 206 to the third to fourth shift valve 38. The valve spool of the second to third shift valve 36 has a first land 218 for receiving the pressures of the third and fourth ports 208 and 210 from opposite directions, a second land 220 for receiving a part of the pressure of the first port 204, a third land 222 for connecting or disconnecting the fifth and sixth ports 212 and 214, and a fourth land 224 for receiving the pressure of the seventh port 216.

The third to fourth shift valve 38, which supplies a hydraulic pressure to the second friction element B2 to make a shift to the fourth speed with the operation of the first and third friction elements C2 and C3, includes a first port 226 for receiving the pressure from the seventh port 216 of the second to third shift valve 36, a second port 228 for receiving a hydraulic pressure from the third clutch valve 46, a third port 230 for receiving the line pressure, and a fourth port 232 for receiving the line pressure controlled by the on/off operation of the sixth solenoid valve S6. Also provided is a fifth port 234 for supplying the pressure of the first or second port 226 or 228 to the second to fourth brake valve 50. The valve spool of the third to fourth shift valve 38 has a first land 236 for receiving the pressures of the third and fourth ports 230 and 232 from opposite directions, a second land 238 for receiving a part of the pressure of the second port 228, and a third land 240 for connecting or disconnecting the first and fifth ports 226 and 234.

The third to second shift valve 40 for supplying the torque pressure from the torque control regulator valve 20 to the second friction element B2 has a first port 242 for receiving the torque pressure, a second port 244 for supplying the torque pressure to the second friction element, a third port 246 for receiving a hydraulic pressure from the third clutch valve 46, a fourth port 248 for receiving the line pressure, and a fifth port 250 for receiving the line pressure controlled by the seventh solenoid valve S7. The valve spool of the third to second shift valve 40 has a first land 252 for receiving the line pressure and the controlled line pressure from opposite directions, a second land 254 for closing the first port 242, and a third land 256 for closing the third port 246.

Figure 5:
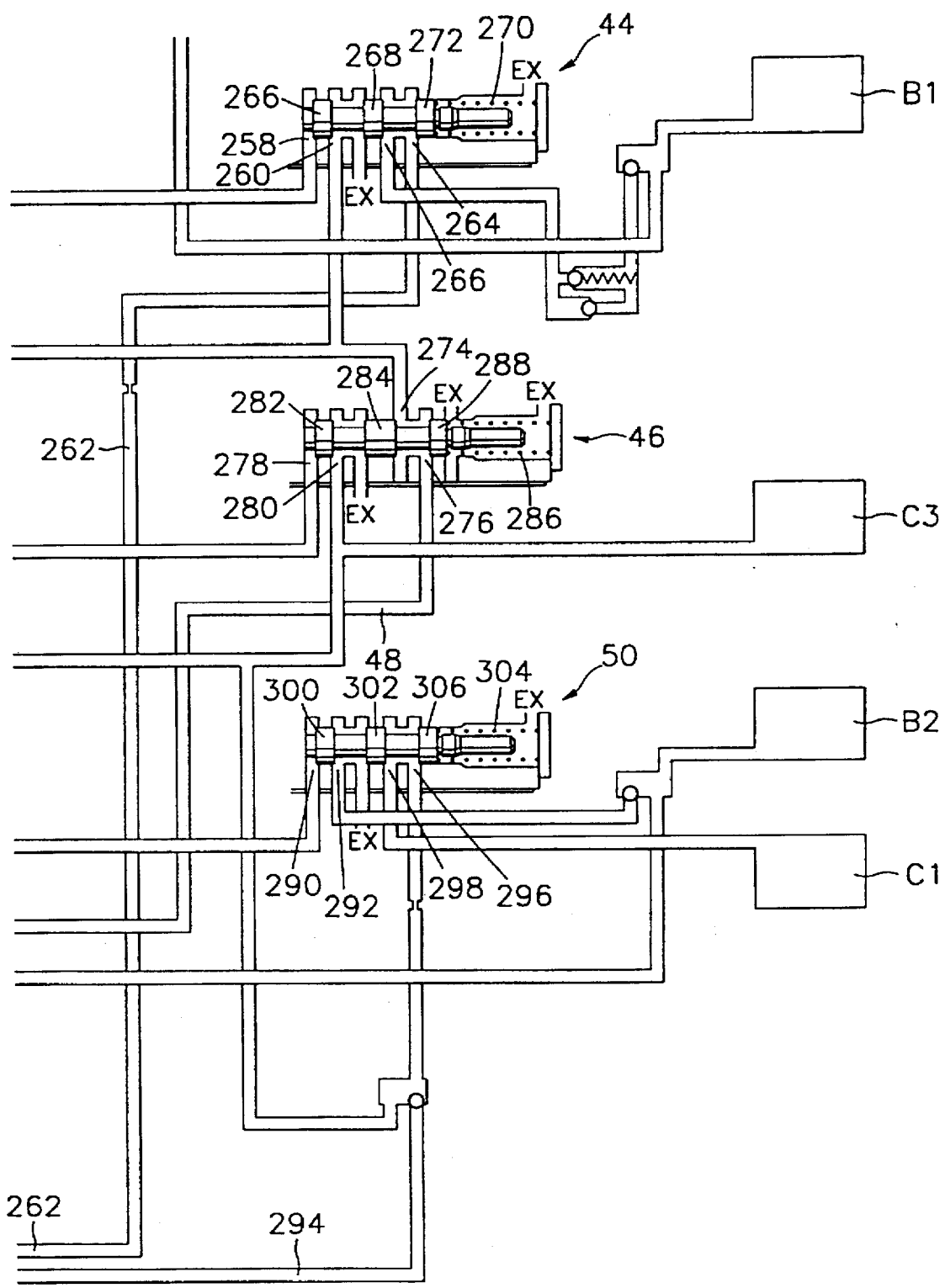
FIG. 5 is an enlarged circuit diagram showing the clutches and the brakes of FIG. 1.

Referring to FIG. 5, the low/reverse clutch valve 44, which receives a hydraulic pressure from the first to second shift valve or from the manual valve 22 in "L" range, has a first port 258 for receiving a hydraulic pressure from the first to second shift valve 34, a second port 260 for supplying the pressure of the first port to the second to third shift valve 36 and the third clutch valve 46, a third port 264 for receiving a hydraulic pressure from the manual valve 22 through the pressure line 262, and a fourth port 266 for supplying the pressure of the third port to the second friction element B1. The valve spool includes a first land 266 for supplying or blocking the pressure of the first port 258 to the second port 260, a second land 268 for connecting or disconnecting the third and fourth ports 264 and 266, and a third land 272 resiliently supported by a spring 270.

The third clutch valve 46, which allows the hydraulic pressure supplied to the second friction element B2 in the second speed, and the hydraulic pressure supplied to the third and fourth friction elements C3 and C1, has a first port 274 for receiving a hydraulic pressure from the second port 260 of the low/reverse clutch valve 44, a second port 276 for supplying the pressure of the first port to the third to second shift valve 40, a third port 278 for receiving a hydraulic pressure from the second to third shift valve 36, and a fourth port 280 for supplying the pressure of the third port to the third to fourth shift valve 38 and the third friction element C3. The valve spool of the third clutch valve 46 has a first land 282 for supplying or blocking the pressure of the third port 278 to the fourth port 280, a second land 284 for connecting or disconnecting the first and second ports 274 and 276, and a third land 288 resiliently supported by a spring 286.

The second to fourth brake valve 50, which allows the hydraulic pressure supplied to the fourth friction element C1 in the third speed, and to the second friction element B2, has a first port 290 for receiving a hydraulic pressure from the fifth port 234 of the third to fourth shift valve 38, a second port 292 for supplying the pressure of the first port to the second friction element B2, a third port 296 for receiving a hydraulic pressure from the manual valve 22 through the pressure line 294 in "2" range, and a fourth port 298 for supplying the pressure of the third port to the fourth friction element C1. The valve spool of the second to fourth brake valve 50 has a first land 300 for supplying or blocking the pressure of the first port to the second port 292, a second land 302 for connecting or disconnecting the third and fourth ports 296 and 298, and a third land 306 resiliently supported by a spring 304.

In operation, when the first solenoid valve S1 is turned off to vary the hydraulic pressure supplied to the fourth port 58 of the pressure regulation valve 8, the pressure applied to the first land 64 is increased or reduced, so that the fifth port 60 communicates with the first port 52 to discharge or block the pressure produced from the oil pump 2. In this way, the line pressure is adjusted supplied to the first port 92 of the solenoid supply valve 16, then discharged through the second port 94. A part of the pressure discharged is supplied to the third port 96, and thus applied to the right side of the third land 104 so as to move the valve spool of the solenoid valve spool 16 toward the left in the drawing.

Thus, the second land 102 partly closes the second port 94 so as to reduce the hydraulic pressure supplied to the third port 96 through the second port, thereby making the valve spool be moved by the resilient force of the spring 98. Repeating this operation, the hydraulic pressure from the second port 94 is supplied to the first port 106 of the torque control regulator valve 20. In this case, the hydraulic pressure is increased or decreased by the on/off operation of the third solenoid valve S3 so as to vary the movement of the first plug 114.

When the third solenoid valve S3 is turned off, the first plug 114 moves to the left side in the drawing compressing the spring 116, thus moving the land 118 to the left side by means of the resilient force of the spring. In this case, when the shift mode is changed from "N" range to "D" range, the pressure of the pressure line 14 partly passes the manual valve 22 flowing through the drive pressure line 24 into the second port 108 of the torque control regulator valve 20. Thus, the land 118 moves to the left side, thereby moving the second plug 122 to the left side, so that the second port 108 communicates with the third port 110 causing the pressure of the second port 108 to flow out through the third port 110.

A part of the pressure of the third port 110 flows into the first port 124 of the control switch valve 26, while a part of the pressure is supplied to the first port 142 of the N-D control valve 142. Meanwhile, the hydraulic pressure of the pressure line 14 partly is supplied to the second port 144 of the N-D control valve 28 moving the valve spool to the right side in the drawing, so that the first and fourth port of the N-D control valve 28 communicate. Hence, the pressure supplied from the torque control regulator valve 20 to the first port 142 flows through the fourth port 148 to the first friction element C2. Namely, the first friction element C2 is first worked by the torque pressure. In addition, the pressure of the fourth port 148 of the N-D control valve 28 is partly supplied to the fifth port 150, so that the pressure is exerted to the right side of the third land 156 moving the valve spool to the left in the drawing.

Figure 6:
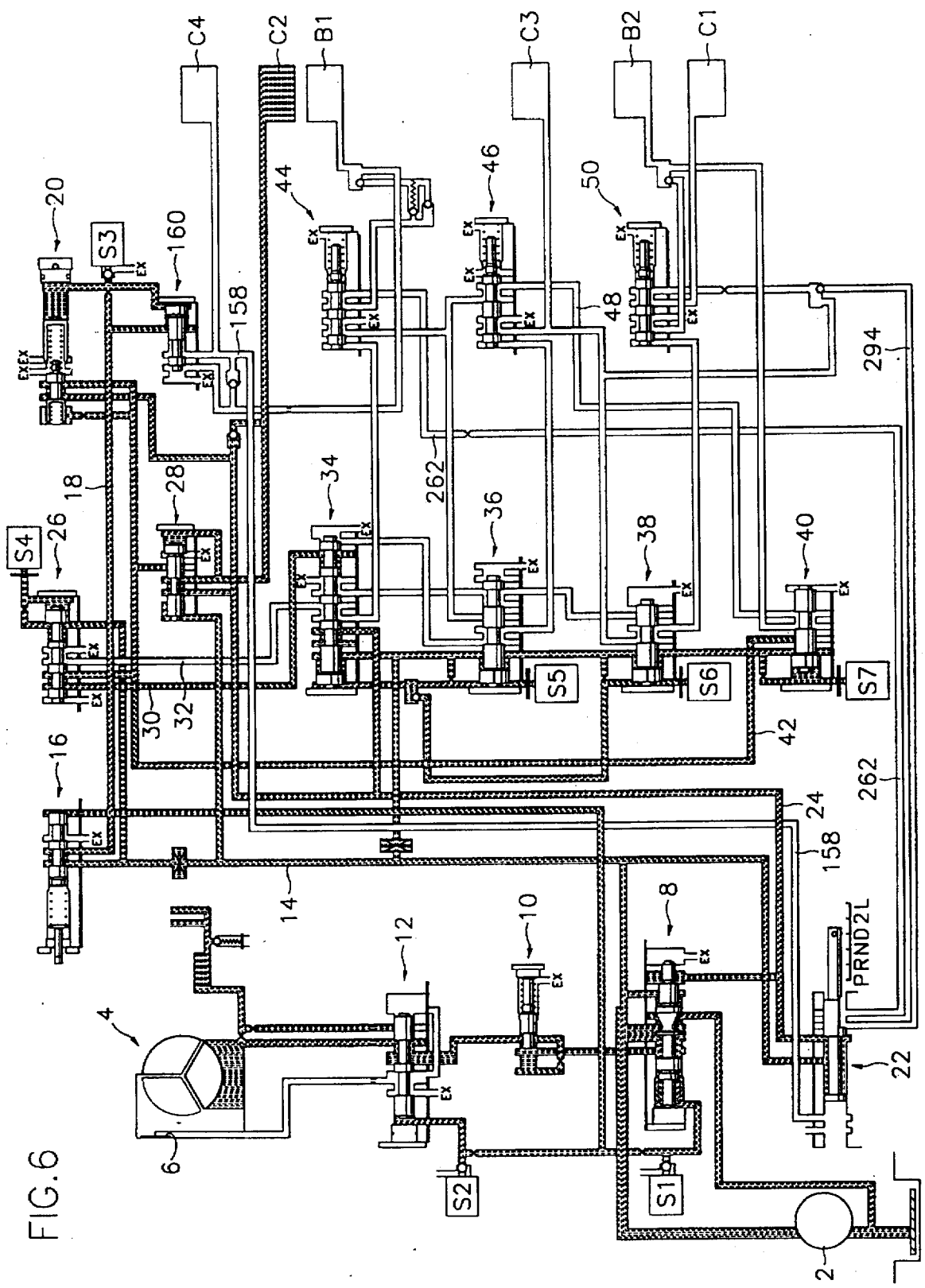
FIG. 6 is a diagram similar to FIG. 1 illustrating the first forward speed control according to the present invention.

Thus, the third and fourth ports 146 and 148 of the N-D control valve 28 communicate, and in addition the third port 146 is supplied with the drive pressure from the manual valve 22, so that the working pressure of the first friction element C2 is replaced by the drive pressure completing the shifting operation to the first speed, as shown in FIG. 6.

When the vehicle speed, and thus the degree of the opening of the throttle valve, is increased, the fourth solenoid valve S4 is turned on to move the valve spool of the control switch valve 26 to the right. Then, the pressure of the first port 124 flows through the third port 128 to the second torque pressure line 32 supplied to the second port 178 of the first to second shift valve 34. Since the valve spool of the first to second shift valve 34 is positioned in the left as shown in FIG. 6, the pressure of the second port 178 flows out through the eighth port 190 supplied to the first port 258 of the low/reverse clutch valve 44.

The pressure of the first port 258 of the low/reverse clutch valve 44 is exerted to the left side of the first land 266 moving the valve spool to the right in the drawing, so that the pressure flows through the second port 260 to the fifth port 212 of the second to third shift valve 36 and to the first port 274 of the third clutch valve 46. Since the valve spool of the third clutch valve 46 is positioned to the left by the resilient force of the spring 286, the pressure of the first port 274 flows through the second port 276 to the third port 246 of the third to second shift valve 40. Meanwhile, since the seventh solenoid valve S7 is turned off, the valve spool of the third to second shift valve 40 moves to the right making the third port 246 communicate with the second port 244. The pressure of the second port 244 is supplied to the second friction element B2 beginning the second speed control.

When the fifth solenoid valve S5 is turned off, the valve spool of the first to second shift valve 34 is moved to the right, and therefore the eighth port 190 communicates with the seventh port 188 replacing the torque pressure by the drive pressure. Hence, the second friction element B2 is worked by the drive pressure completing the second speed control.

Figure 7:
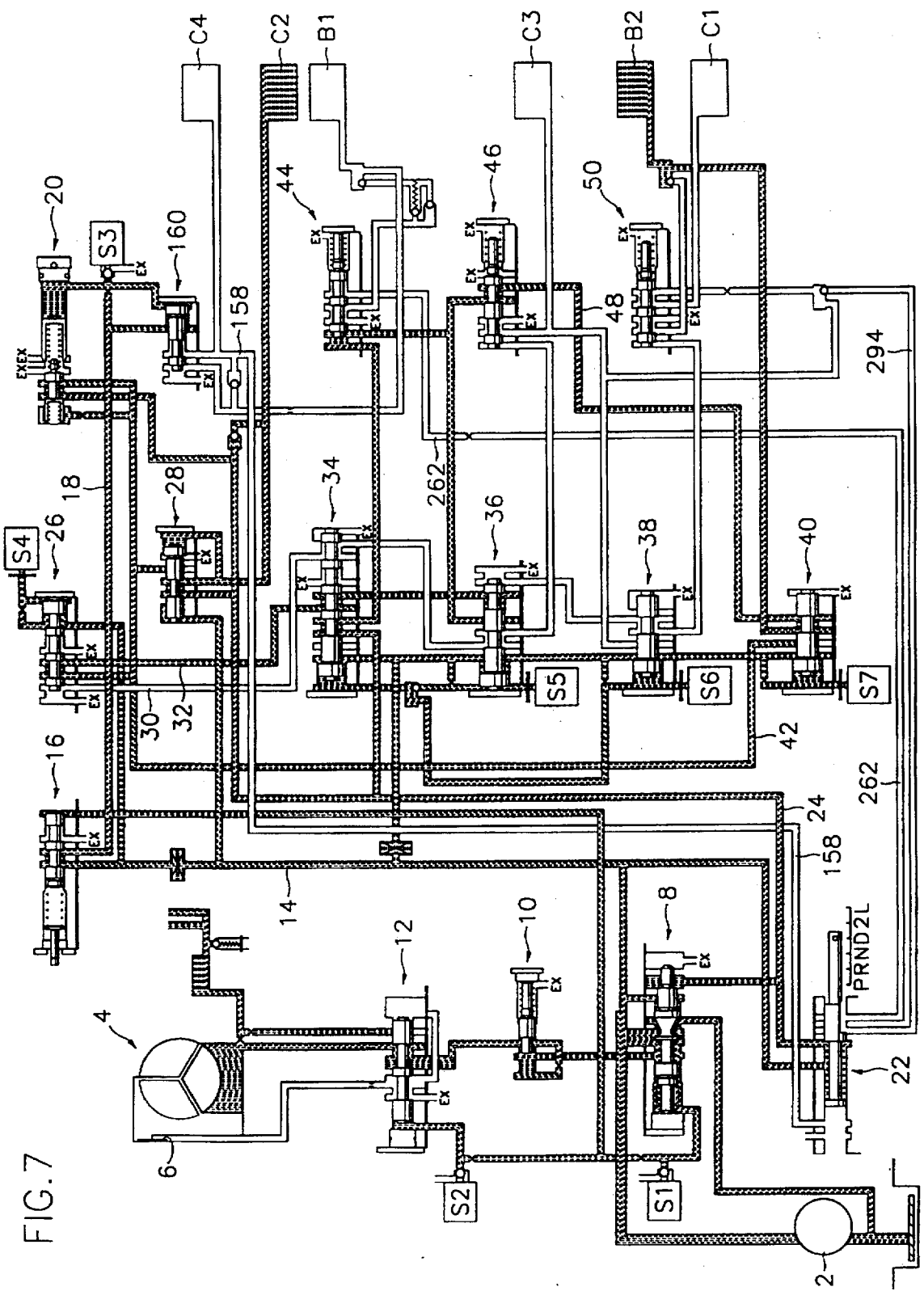
FIG. 7 is a diagram similar to FIG. 1 illustrating the second forward speed control according the present invention.

Further increasing the vehicle speed from the second speed and thus further increasing the degree of opening of the throttle valve, the fourth solenoid valve S4 is turned off to move the valve spool of the control switch valve 26 to the left in the drawing. Hence, the torque pressure supplied to the first port 124 from the torque control regulator valve 20 flows through the second port 126 to the first torque pressure line 30 to the first port 176 of the first to second shift valve 34. Since the valve spool of the first to second shift valve 34 is positioned to the right as shown in FIG. 7, the torque pressure of the first port 176 flows through the third port 180 to the first port 204 of the second to third shift valve 36. However, since the valve spool of the second to third shift valve 36 is positioned in the left as shown in FIG. 7, the pressure of the first port 204 flows through the sixth port 214 to the third port 278 of the third clutch valve 46.

Figure 8:
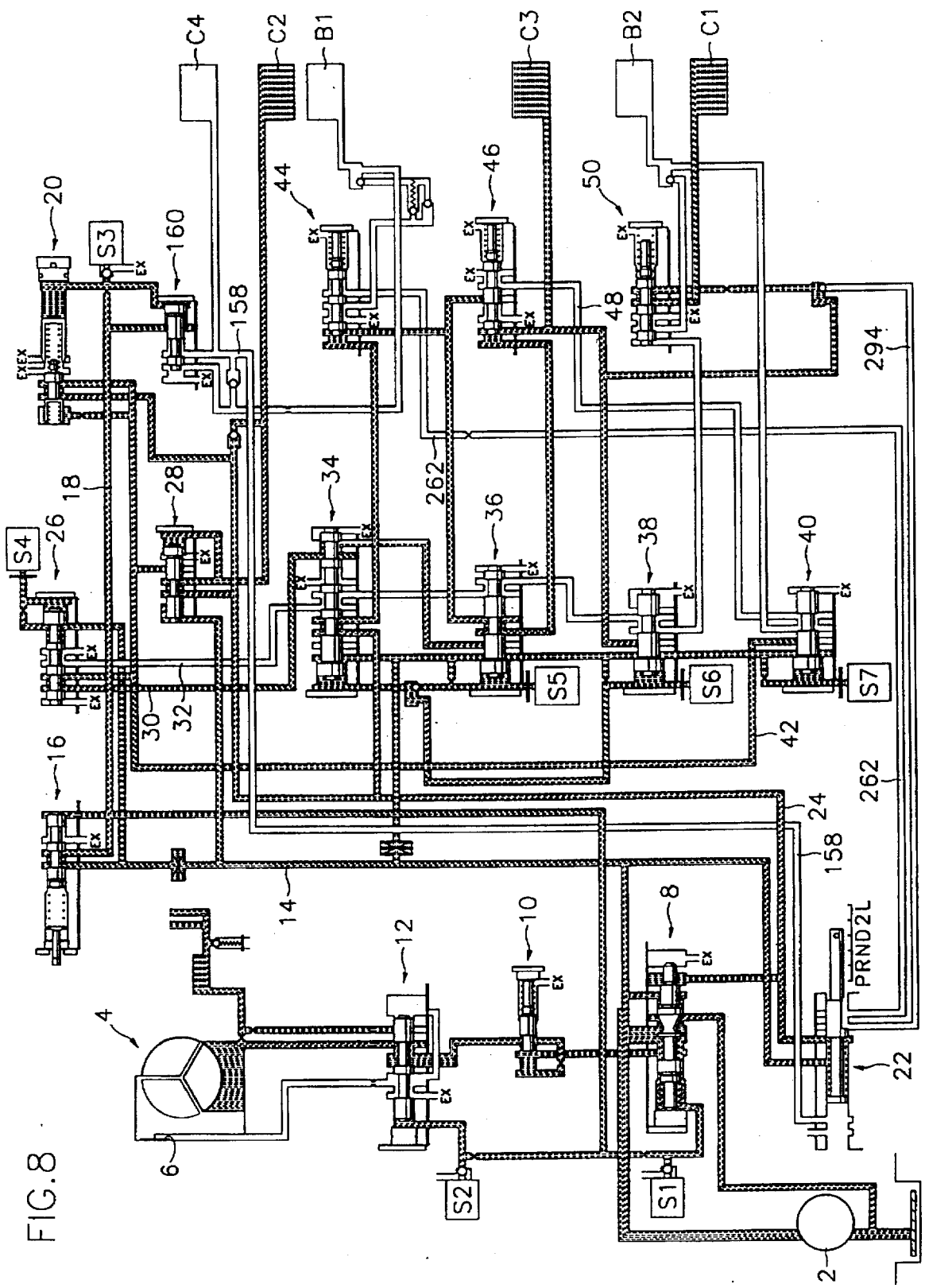
FIG. 8 is a diagram similar to FIG. 1 illustrating the third forward speed control according to the present invention.

The pressure of the third port 278 moves the valve spool of the third clutch valve 46 to the right supplied through the fourth port 280 to the third friction element C3, and partly to the third port 296 of the second to fourth brake valve 50. Since the valve spool of the second to fourth brake valve 50 is positioned in the left side of the drawing under the resilient force of the spring 304, the torque pressure of the third port 296 flows through the fourth port 298 to the fourth friction element C1, thereby beginning the third speed control. Then, the fifth solenoid valve S5 is turned off to move the valve spool of the second to third shift valve 36 to the right as shown in FIG. 8, so that the sixth port 214 is blocked from the first port 204, but communicates with the fifth port 212 to supply the drive pressure to the third and fourth friction elements, as shown in FIG. 8. Thus the shift to the third speed is completed.

Further increasing the vehicle speed, the fourth solenoid valve S4 is turned on to move the valve spool of the control switch valve 26 to the right in the drawing, so that the torque pressure of the first port 124 flows out through the third port 128 to the second torque pressure line 32 to the second port 178 of the first to second shift valve 34. Since the valve spool of the first to second shift valve 34 is positioned in the right, the torque pressure of the second port 178 is supplied through the fourth port 182 to the second port 206 of the second to third shift valve 36.

Since the valve spool of the second to third shift valve 36 is positioned to the right, the pressure of the second port 206 flows out through the seventh port 216 supplied to the first port 226 of the third to fourth shift valve 38. Since the valve spool of the third to fourth shift valve 38 is moved to the right as shown in FIG. 8, the torque pressure of the first port 226 is supplied through the fifth port 234 to the first port 290 of the second to fourth brake valve 50. Hence, the valve spool of the second to fourth brake valve 50 is moved to the right in the drawing opening the second port 292, so that the torque pressure of the first port is supplied to the second friction element B2 beginning the fourth speed control.

Figure 9:
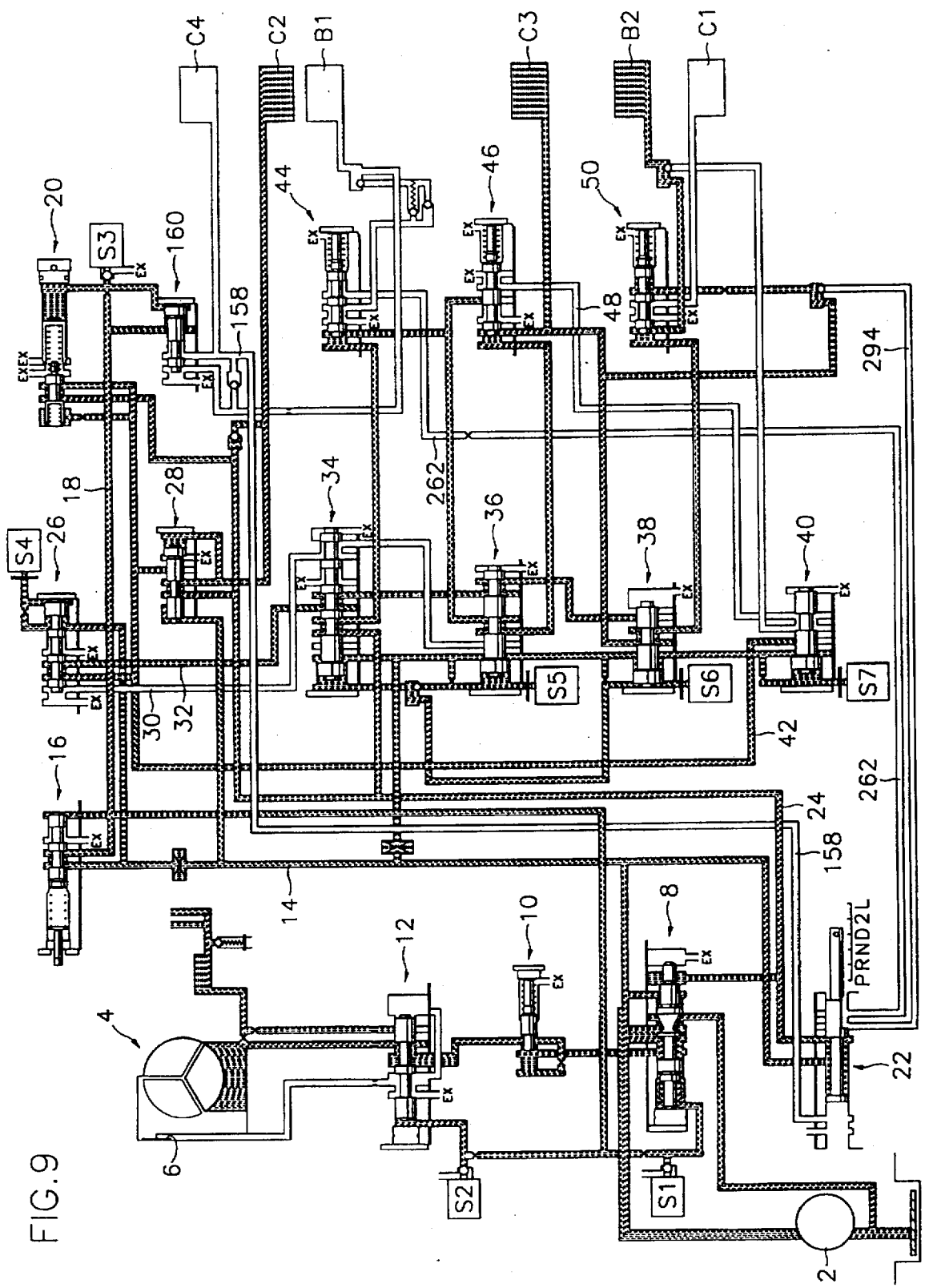
FIG. 9 is a diagram similar to FIG. 1 illustrating the fourth forward speed control according to the present invention.

Then, the sixth solenoid valve S6 is turned on to make the second port 228 of the third to fourth shift valve 38 ready to supply the drive pressure communicate with the fifth port 234. Consequently, the first port 226 which has been supplying the torque pressure is cut off to supply the drive pressure through the fifth port 234 to the second friction element B2, thus completing the fourth speed control, as shown in FIG. 9.

Figure 10:
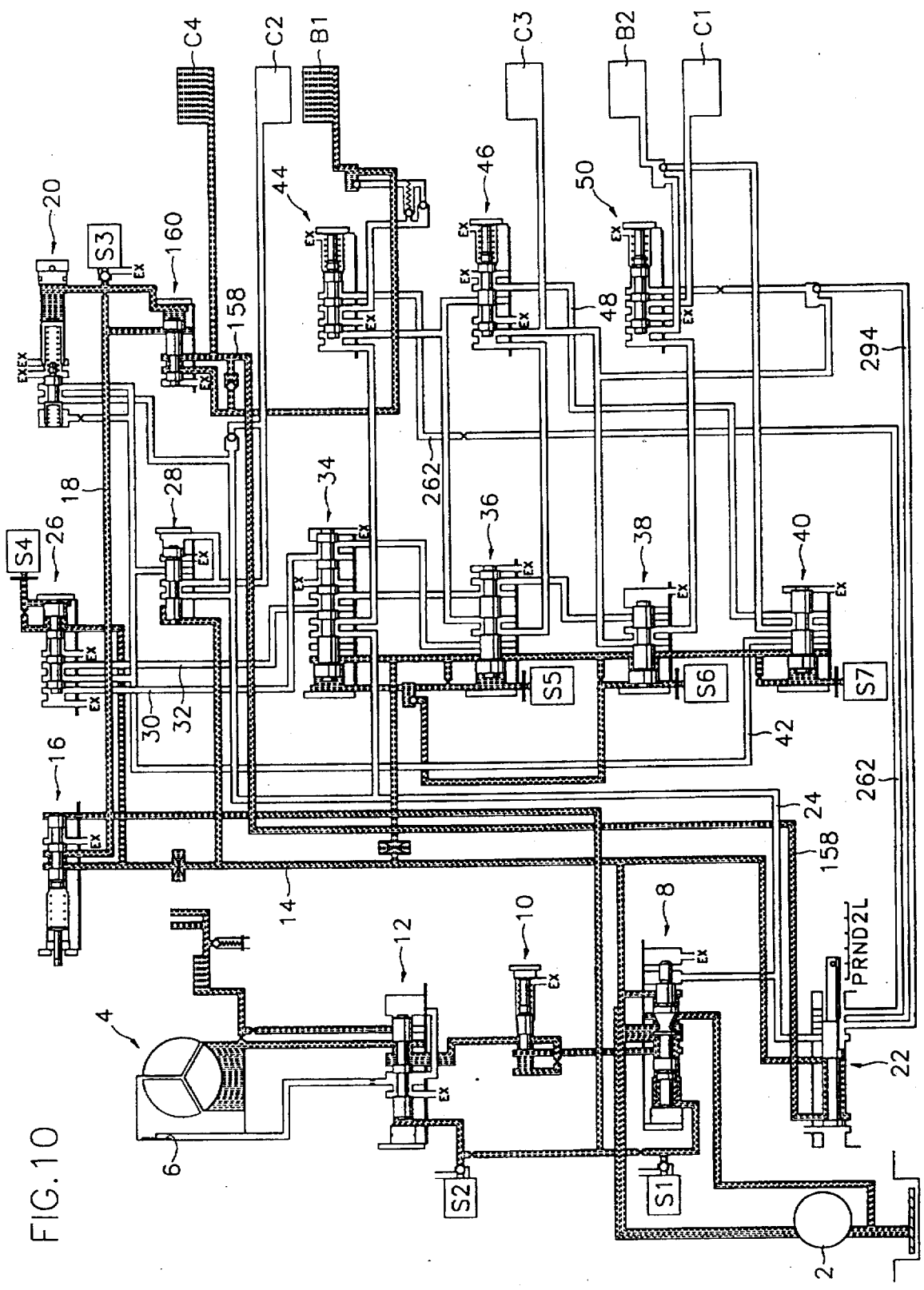
FIG. 10 is a diagram similar to FIG. 1 illustrating the reverse drive control according to the present invention.

When the shift mode is changed to the reverse range (R range), the pressure is supplied from the manual valve 22 through the reverse pressure line 158 to the third port 166 of the rear clutch control valve 160 delivered to the first friction element C4 of the reverse drive. In this case, the first and second ports 162 and 164 of the rear clutch control valve 160 are supplied with the pressure from the solenoid supply valve 16 with the third solenoid valve S3 being turned off. Hence, the valve spool is moved to the left in the drawing, so that the third port 166 of the rear clutch control valve 160 communicates with the fourth port 168 to supply the second friction element B1 of the reverse drive, thus completing the reverse drive control, as shown in FIG. 10.

Figure 11:
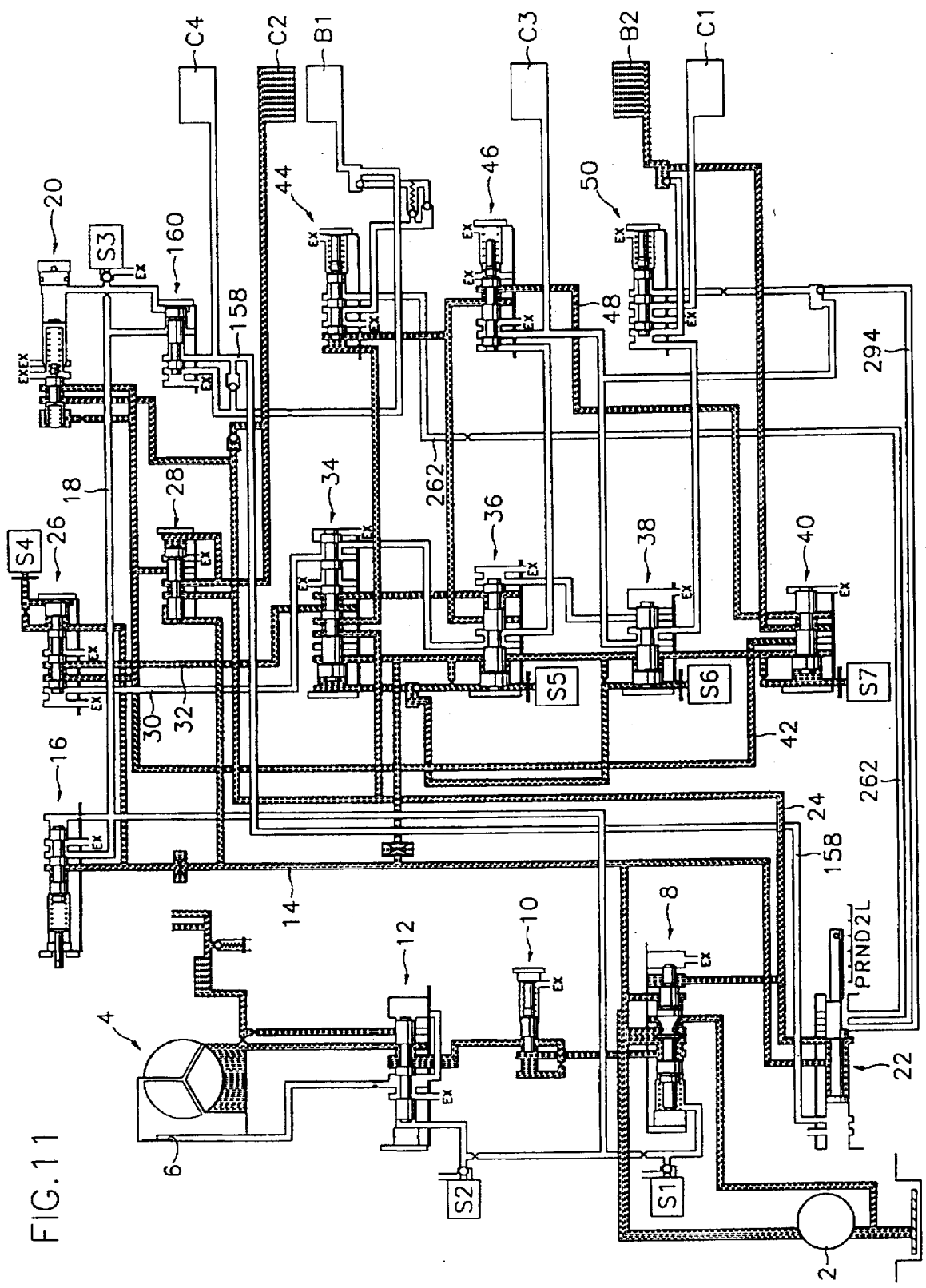
FIG. 11 is a diagram similar to FIG. 1 illustrating the third to second shift control according to the present invention.

Referring to FIG. 11, the downshift control from the third speed to the second speed is accomplished as follows:

First, the drive pressure is delivered through the N-D control valve 28 to the first friction element C2, and the torque pressure, which is supplied from the torque control regulator valve 20 through the pressure line 42 to the first port 242 of the third to second shift valve 40, flows out through the second port 244 to the second friction element B2, starting the second speed control. The pressure supplied to the third and fourth friction elements C3 and C1 flows through the third and fourth ports 278 and 280 of the third clutch valve 46 to the first and sixth ports 204 and 214 of the second to third shift valve 36.

The pressure from the first port 204 is delivered through the first and third ports 176 and 180 of the first to second shift valve 34 to the second port 126 of the control switch valve 26. In this case, since the fourth solenoid valve S4 is turned on, the pressure of the second port is discharged via a discharge port Ex. The torque pressure supplied to the second friction element B2 is replaced by the drive pressure because the seventh solenoid valve S7 is turned off to cut off the first port 242 making the third port 246 communicate with the second port 244.

When running at the fourth speed satisfying the requirements for the skip shift, the sixth solenoid valve S6 is turned off and then again on to supply the torque pressure to the first port 226 of the third to fourth shift valve 38. The torque pressure is discharged under the control of the third and fourth solenoid valves S3 and S4, and delivered to the first port 242 of the third to second shift valve 40 by turning the seventh solenoid valve S7. Then, the seventh solenoid valve S7 is turned off to deliver the drive pressure of the third port 246 through the second port 244 to the second friction element B2, thus completing the skip shift to the second speed.

As described above, the inventive hydraulic control system has the third to second shift valve connected with the torque control regulator valve, so that the skip shift between the fourth and the second speed may be accomplished without the help of a one-way clutch as well as the shift control from the third to the second speed. Moreover, in the emergency mode is provided the third speed hold, so that the fourth friction element is worked to make the engine brake be held, thus improving the running safety. In addition, the working pressure of the solenoid valve is supplied as the line pressure securing a sufficient pressure, thereby improving the working reliability. Besides, when shifting from the neutral mode to the drive mode, the first friction element receives firstly the torque pressure under the control the N-D control valve and then the drive pressure, thereby reducing the shifting shock.

What is claimed is:

1. A hydraulic control system of an automatic transmission used in a vehicle, comprising:

a torque converter for transferring an engine power to an input shaft of the transmission;

an oil pump for pumping oil by means of the engine power;

a pressure regulation means for regulating a line pressure produced by said oil pump according to a running condition of the vehicle;

a damper clutch working control means for changing a direction of the pressure delivered to said torque converter in order to increase a power transfer rate of said torque converter;

a manual valve operatively linked with a shift lever for performing a port change to supply the transmission with a hydraulic pressure suitable to each shifting mode;

an N-D control valve for supplying a torque pressure and a drive pressure to a first friction element to reduce shifting shocks during range changing from a neutral mode to a running mode;

a torque control regulator valve for converting the drive pressure to a torque control valve according to a duty control;

a control switch valve for alternately supplying the torque pressure of said torque control regulator valve to a first and a second torque pressure line according to an on/off operation of a solenoid valve;

a first to second shift valve, a second to third shift valve, a third to fourth shift valve and a third to second shift valve for making a port change with a control port receiving/discharging a hydraulic pressure according to the on/off operation of the solenoid valve so as to selectively supply the torque pressure of the first and the second torque pressure line and the drive pressure of a manual valve to the friction element; and a low/reverse clutch valve, a third clutch valve, and a second to fourth brake valve for receiving or supplying the torque pressure or drive pressure from or to the shift valves.

2. A hydraulic control system as defined in claim 1, wherein said first to second shift valve has two ports for alternately receiving the torque pressure, a port for receiving the drive pressure, a port for successively delivering the torque and the drive pressure, and ports for receiving the line pressure to make the port changes.

3. A hydraulic control system as defined in claim 1, wherein said second to third shift valve has two ports connected to said first to second shift valve for receiving the torque pressure, a port for selectively receiving the torque or drive pressure from the low/reverse clutch valve, and a port for receiving the line pressure as a control pressure.

4. A hydraulic control system as defined in claim 1, wherein said third to fourth shift valve has a port for receiving the pressure from said second to third shift valve, a port for selectively receiving the torque or drive pressure from the third clutch valve, and a port for receiving the line pressure as a control pressure.

5. A hydraulic control system as defined in claim 1, wherein the low/reverse clutch valve is connected with said manual valve to receive the hydraulic pressure supplied to a second friction element of the reverse drive in a "L" range.

6. A hydraulic control system as defined in claim 1, wherein the second to fourth brake valve is connected with the manual valve to supply a hydraulic pressure to fourth friction element in a "2" range.

7. A hydraulic control system as defined in claim 1, wherein said third to second shift valve has a port for receiving the torque pressure, a port for receiving the drive pressure from the third clutch valve, a port for selectively supplying the torque or the drive pressure to a fourth friction element, and a port for receiving the line pressure to make the, port changes.

8. A hydraulic control system as defined in claim 7, wherein said third to second shift valve controls the fourth friction element in a downshift from a third to a second speed and a kickdown skip shift from a fourth to the second speed by means of a control pressure.

9. A hydraulic control system as defined in claim 7, wherein said third to second shift valve is controlled by a control pressure in a manual shift to a "2" range during a fourth, a third, or a second speed in a "D" range.

* * * * *

UNITED STATES PATENT AND TRADEMARK OFFICE
CERTIFICATE OF CORRECTION

PATENT NO. : 5,667,453
DATED : September 16, 1997
INVENTOR(S) : Jaeduk Jang
Kibeen Lim It is certified that error appears in the above-indentified patent and that said Letters Patent is hereby corrected as shown below:

Claim 7, Col. 12; Line 23, before "port" delete --,--.

Signed and Sealed this

Second Day of December, 1997

*Attest:*

BRUCE LEHMAN

*Attesting Officer*    Commissioner of Patents and Trademarks